United States Patent
Krishnamoorthy

(10) Patent No.: US 9,419,860 B2
(45) Date of Patent: Aug. 16, 2016

(54) METHOD FOR MANAGING A LOGICAL TOPOLOGY CHANGE IN A NETWORK

(75) Inventor: Balasubramanian Krishnamoorthy, Bangalore (IN)

(73) Assignee: TEJAS NETWORKS LIMITED, Bangalore (IN)

( * ) Notice: Subject to any disclaimer, the term of this patent is extended or adjusted under 35 U.S.C. 154(b) by 210 days.

(21) Appl. No.: 14/008,571

(22) PCT Filed: Jul. 7, 2011

(86) PCT No.: PCT/IB2011/053028
§ 371 (c)(1),
(2), (4) Date: Sep. 30, 2013

(87) PCT Pub. No.: WO2012/131446
PCT Pub. Date: Oct. 4, 2012

(65) Prior Publication Data
US 2014/0119235 A1    May 1, 2014

(30) Foreign Application Priority Data
Mar. 31, 2011    (IN) .......................... 1038/CHE/2011

(51) Int. Cl.
*H04L 12/28* (2006.01)
*H04L 12/24* (2006.01)
*H04L 12/46* (2006.01)
*H04L 12/751* (2013.01)

(52) U.S. Cl.
CPC ............ *H04L 41/12* (2013.01); *H04L 12/4641* (2013.01); *H04L 45/02* (2013.01)

(58) Field of Classification Search
CPC .................. H04L 45/04–45/60; H04W 84/00; H04W 84/005; H04W 84/022; H04W 84/025; H04W 84/027; H04W 84/04; H04W 84/042; H04W 84/06; H04W 84/08; H04W 84/10; H04W 84/105; H04W 84/12; H04W 84/14; H04W 84/16; H04W 24/00–24/10
USPC ................. 370/254–258, 389–394, 400–408, 370/419–420, 423–426
See application file for complete search history.

(56) References Cited

U.S. PATENT DOCUMENTS

| | | | |
|---|---|---|---|
| 4,644,532 A * | 2/1987 | George et al. ................. 370/255 |
| 6,625,124 B1 * | 9/2003 | Fan et al. ....................... 370/235 |
| 7,502,354 B1 * | 3/2009 | Maufer ......................... 370/338 |
| 8,219,794 B1 * | 7/2012 | Wang et al. ....................... 713/2 |
| 2003/0235157 A1 * | 12/2003 | Boivie et al. .................. 370/254 |
| 2005/0105905 A1 * | 5/2005 | Ovadia et al. .................... 398/47 |
| 2007/0195794 A1 * | 8/2007 | Fujita .................. H04L 12/4633 370/395.53 |
| 2008/0075020 A1 * | 3/2008 | Hemberger et al. .......... 370/255 |

(Continued)

*Primary Examiner* — Thai Hoang
(74) *Attorney, Agent, or Firm* — Deborah A. Gador

(57) ABSTRACT

The present disclosure relates to managing a logical topology change in a network. The entries of the forwarding database are flushed intelligently without arbitrarily removing the forwarding database resulting in flooding. In one embodiment, a logical topology number (LTN) is maintained by all the interfaces and the forwarding database in the logical topology. In case of any change in the network topology, the LTN of the interfaces affected by the topology change is changed. Further, while sending a frame, LTN of the forwarding database entry for a destination address is compared with LTN of the logical topology. In case of mismatch, the entry is invalidated and the frame is flooded to all other ports for entering new entries into the database. LTN of the forwarding database entry for a source address is compared with the LTN of the logical topology.

8 Claims, 4 Drawing Sheets

(56) References Cited

U.S. PATENT DOCUMENTS

| | | | |
|---|---|---|---|
| 2008/0186907 A1* | 8/2008 | Yagyuu et al. | 370/328 |
| 2009/0116404 A1 | 5/2009 | Mahop et al. | |
| 2009/0144403 A1 | 6/2009 | Sajassi et al. | |
| 2011/0051624 A1 | 3/2011 | Gnanasekaran | |

* cited by examiner

METHOD FOR MANAGING A LOGICAL TOPOLOGY CHANGE IN A NETWORK

CROSS-REFERENCE TO RELATED APPLICATION

The present application claims priority to Indian patent application serial number 1038/CHE/2011 filed on Mar. 31, 2011, and claims the benefit of international application PCT/IB 2011/053028 filed Jul. 7, 2011, the entire contents of which are incorporated by reference.

TECHNICAL FIELD

The present disclosure relates to communication networks. In particular, the present disclosure relates to managing a logical topology change in a communication network.

BACKGROUND

Network devices frequently employ some kind of forwarding scheme to forward packets to various destinations on a network. Such forwarding schemes commonly include maintaining a forwarding database that has forwarding entries. A forwarding entry will typically have at least a destination address and a corresponding port.

In various types of networks, changes in the topology of the network are, for practical purposes, inevitable. When the topology of a network changes, the forwarding entries maintained in the forwarding database of the network device often become invalid. Thus, a typical response to a topology change is to perform an operation that flushes the entries in the forwarding database. In other words, the forwarding entries in the forwarding database are flushed, or deleted on network devices so that forwarding entries can be relearned for various destination addresses to indicate valid forwarding information.

So, when a forwarding database is flushed, all of the entries are invalidated and, thus, any incoming packet will trigger a forwarding database (or FDB) lookup that indicates there is no valid entry for the particular destination address associated with the packet. Accordingly, the packet will then be flooded out on all ports of the network device associated with the particular network or black holed.

One challenge presented by flushing in response to a network topology change is that flushing forwarding entries can take a long time. Also, some forwarding databases may be very large with a large number of media access control (MAC) addresses. Not only can flushing and the subsequent relearning take a long time, but it is often the case that many entries are flushed/deleted unnecessarily. In few conventional systems, software selectively removes the entries one-by-one from the database. In other conventional systems, flushing is a one-size-fits-all solution and does not take into account ports and/or links on the network that are unaffected by the topology change.

Therefore, there is a need to develop a method to intelligently flush entries from a database in response to a logical topology change in a physical network.

SUMMARY OF THE DISCLOSURE

In one embodiment, the present disclosure relates to a method for managing a logical topology change in a physical network. The network comprises a plurality of nodes having one or more interfaces associated with the logical topology and a forwarding database. The method maintains a logical topology number (LTN) for each of the logical topology. The method comprises steps of sending a frame from a client interface of a source node to a client interface of a destination node. Any change in the logical topology is identified by a method. Upon identification, a topology change message is generated to notify the nodes in the logical topology about the changes in the logical topology. Upon receipt of topology change message, the LTN associated with the logical topology is changed. Further the method comprises comparing a LTN associated with the logical topology with the LTN associated with the destination node in the forwarding table and if the LTN is different, all the entries relating to the destination node is invalidated from the forwarding database and the frame is broadcast on all the interfaces of the logical topology for entering new entries into the database or black holed.

In one embodiment, the present disclosure relates to a system for managing a logical topology change in a physical network. The network comprises a plurality of nodes having one or more interfaces associated with the logical topology and a forwarding database. The system comprises a processor. The processor is configured to maintain a logical topology number (LTN) for each of the logical topology The processor sends a frame from a client interface of a source node to a client interface of a destination node. Any change in the logical topology is identified. Upon identification, a topology change message is generated to notify the nodes in the logical topology about the changes in the logical topology. Upon receipt of topology change message, the LTN associated with the logical topology is changed. Further the processor compares a LTN associated with the interface of the logical topology with the LTN associated with the destination node in the forwarding table of the source node. Based on the comparison, all the entries relating to the destination node is invalidated from the forwarding database and the frame is broadcasted on all the interfaces of the logical topology for entering new entries into the database.

BRIEF DESCRIPTION OF THE DRAWINGS

The features of the present disclosure are set forth with particularity in the appended claims. The disclosure itself, together with further features and attended advantages, will become apparent from consideration of the following detailed description, taken in conjunction with the accompanying drawings. One or more embodiments of the present disclosure are now described, by way of example only, with reference to the accompanied drawings wherein like reference numerals represent like elements and in which:

Figure 1:
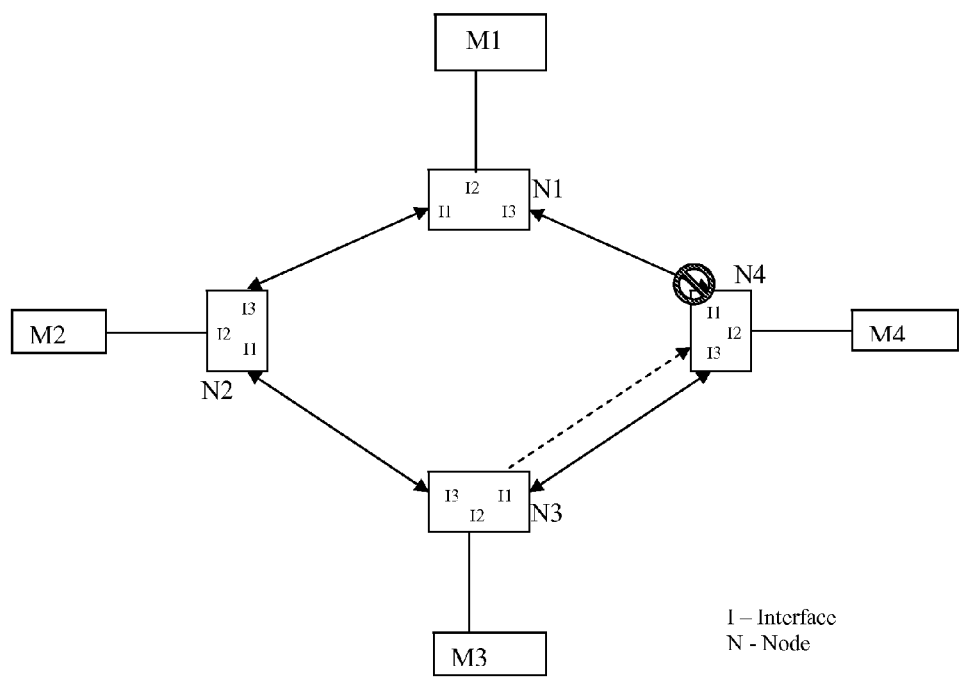
FIG. 1 illustrates a ring network according to an exemplary embodiment of the present disclosure.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

The present disclosure relates to communication networks. In particular, the present disclosure relates to managing a logical topology change in a communication network.

In one embodiment, the present disclosure relates to a method for managing a logical topology change in a physical network. The network comprises a plurality of nodes having one or more interfaces associated with the logical topology and a forwarding database. The method maintains a logical topology number (LTN) for each of the logical topology. The method comprises steps of sending a frame from a client interface of a source node to a client interface of a destination node. Any change in the logical topology is identified. Upon identification, a topology change message is generated to notify the nodes in the logical topology about the changes in the logical topology. Upon receipt of topology change message, the LTN associated with the logical topology is changed. Further the method comprises comparing a LTN associated with the interface of the logical topology with the LTN associated with the destination node in the forwarding table. Based on the comparison, all the entries relating to the destination node is invalidated from the forwarding database upon a LTN mismatch and the frame is broadcast on all the interfaces of the logical topology for entering new entries into the database or black holed.

In another embodiment of the present disclosure, upon receipt of the frame, updating the LTN associated with the source node in the forwarding table if LTN associated with the interface of the logical topology is not equal to LTN associated with the source node in the forwarding table.

In yet another embodiment of the present disclosure, upon receipt of topology change message the logical topology number of the interfaces in the logical topology is incremented.

In still another embodiment of the present disclosure, the network is a bridged virtual local area network.

In another embodiment of the present disclosure, the forwarding database comprises a plurality of entries including address of the destination node, interface and the logical topology number.

In yet another embodiment of the present disclosure, the topology change messages are selected from the messages defined in IEEE standards, ITU standards and other standards relating to topology change messages.

In one embodiment, the present disclosure relates to a system for managing a logical topology change in a physical network. The network comprises a plurality of nodes having one or more interfaces associated with the logical topology and a forwarding database. The system comprises a processor. The processor is configured to maintain a logical topology number (LTN) for each of the logical topology The processor sends a frame from a client interface of a source node to a client interface of a destination node. Any change in the logical topology is identified. Upon identification, a topology change message is generated to notify the nodes in the logical topology about the changes in the logical topology. Upon receipt of topology change message, the LTN associated with the logical topology is changed. Further the processor compares a LTN associated with the interface of the logical topology with the LTN associated with the destination node in the forwarding table of the source node. Based on the comparison, all the entries relating to the destination node is invalidated from the forwarding database and the frame is broadcasted on all the interfaces of the logical topology for entering new entries into the database.

A computer network typically comprises a plurality of interconnected entities. An entity may consist of any network device, such as a server or end station or node that transmits or receives data frames. A common type of computer network is a local area network ("LAN") which typically refers to a privately owned network within a single building or campus.

One or more intermediate network devices are often used to couple LANs together and allow the corresponding entities to exchange information. For example, a bridge may be used to provide a "bridging" function between two or more LANs or end stations. (Notably, a bridge may also be referred to as a switch, which may provide a switching function, and bridge and switch are used interchangeably herein, as understood by those skilled in the art). Although bridges may operate at various levels of the communication protocol stack, they typically operate at Layer 2 (L2) which, in the OSI Reference Model, is called the data link layer and includes the Logical Link Control (LLC) and Media Access Control (MAC) sublayers. Data frames at the data link layer typically include a header containing the MAC address of the entity sourcing the message, referred to as the source address, and the MAC address of the entity to whom the message is being sent, referred to as the destination address. To perform the bridging function, L2 bridges examine the MAC destination address of each data frame received on a source port. The frame is then switched onto the destination port(s) associated with that MAC destination address.

The communication of the network can be managed by any of the protocols including but not limited to spanning tree protocols (STPs), such as the known Rapid STP (RSTP) and/or Multiple STP (MST), Shortest Path Bridging protocol (SPB). Also, the present invention uses operators like ERPS (Ethernet Ring Protection Switching) for loop avoidance in an Ethernet ring which is achieved by guaranteeing that, at any time, traffic may flow on all but one of the ring links. This particular link is called the Ring Protection Link (RPL), and under normal conditions this ring link is blocked, i.e., not used for service traffic. One designated Ethernet Ring Node, the RPL Owner Node, is responsible to block traffic at one end of the RPL. Under an Ethernet ring failure condition, the RPL Owner Node is responsible to unblock its end of the RPL, unless the RPL failed, allowing the RPL to be used for traffic.

Figure 2:
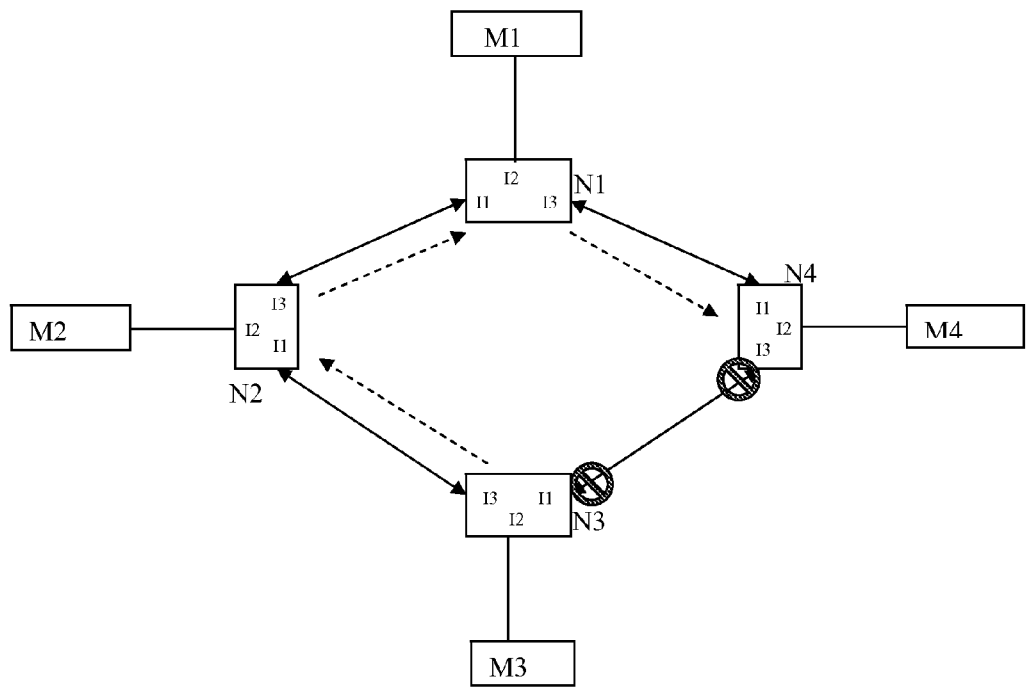
FIG. 2 illustrates a ring network according to another exemplary embodiment of the present disclosure.

FIGS. 1 and 2 illustrate a ring network according to exemplary embodiments of the present disclosure.

The network comprises four nodes N1, N2, N3 and N4. Each of the nodes is connected to one end station with MAC address M1, M2, M3 and M4 respectively. The nodes are connected to one another with more interfaces. In one embodiment, each of the nodes has 3 interfaces I1, I2 and I3.

The interface communicating with the end stations is referred to as client interface I2 and the interfaces communicating with the nodes are referred to as network interfaces I1, I3. Those skilled in the art will understand that any number of nodes, devices, links, etc. may be used in the computer network, and that the view shown herein is for illustration.

In the present disclosure, the interface I1 of node N4 is blocked for traffic which ensures that the network is loop free. Each of the nodes has a forwarding database which comprise of the following elements namely MAC address, interface and Logical topology number (LTN). In addition, all the interfaces of the logical topology store a logical topology number. The logical topology number of all the interfaces is initially assumed to be 1. The following tables illustrate an exemplary embodiment of the forwarding database for node N3 and N4.

| Node N3 FDB | | |
| --- | --- | --- |
| MAC Address | Interface | Logical Topology Number |
| M4 | 1 | 1 |

| Node N4 FDB | | |
| --- | --- | --- |
| MAC Address | Interface | Logical Topology Number |
| M3 | 3 | 1 |

Figure 3:
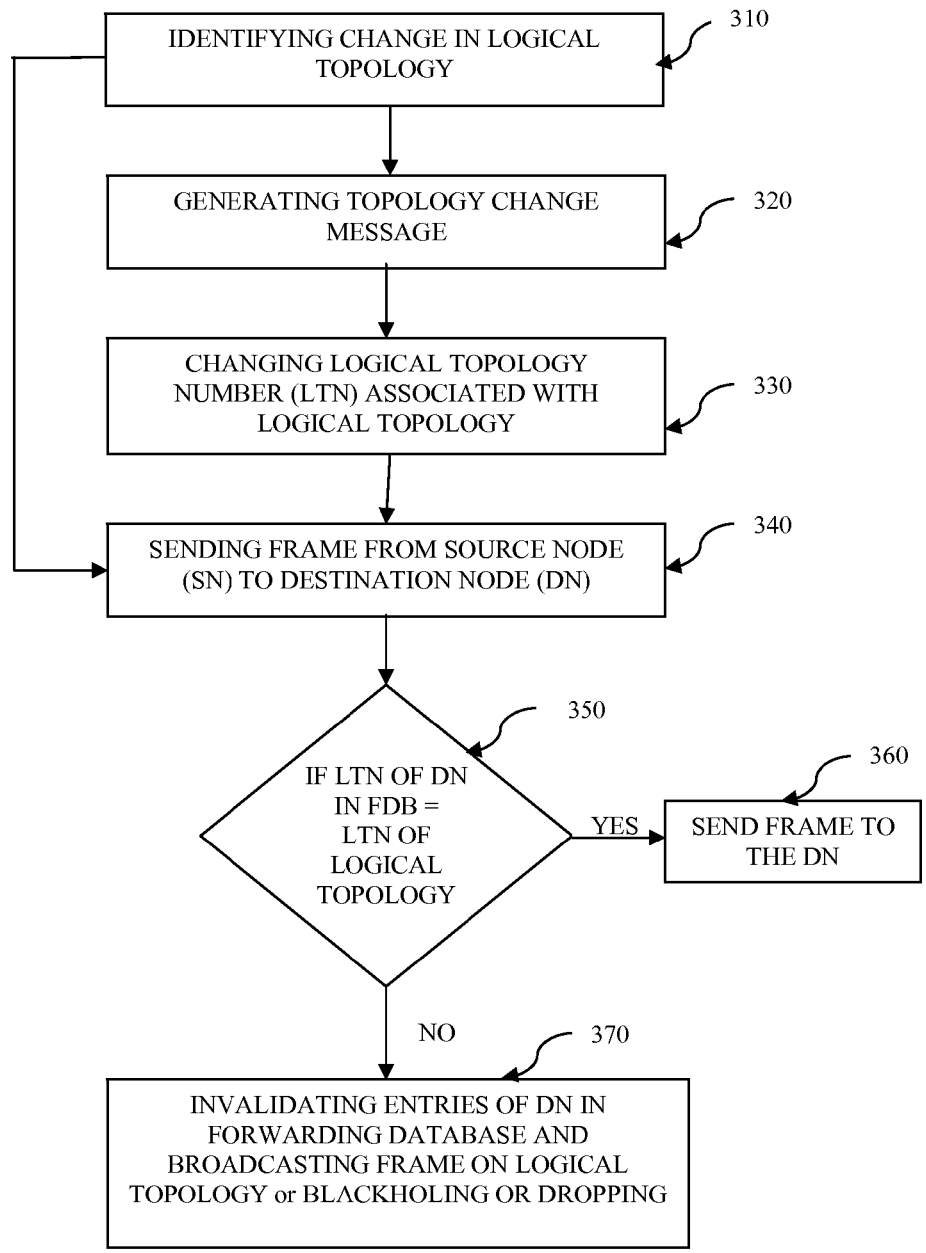
FIG. 3 illustrates a flowchart for method of managing a change in logical topology according to an embodiment of the present disclosure.

FIG. 3 illustrates a flowchart for method of managing a change in logical topology according to an embodiment of the present disclosure.

Now, in an exemplary embodiment, a frame is sent from node N3 (herein referred to as source node) to node N4 (herein referred to as destination node). If the destination node N4 does not receive the frame within a predetermined time limit due to a fault in the interface mentioned in the forwarding database, a change in the local topology is identified at 310. Upon detection of a change in the local topology, a topology change message is generated at 320. Upon detection of problem, the block from interface I1 of node N4 is removed and interface I1 of N3 and interface I3 of N4 are now blocked for traffic as illustrated in FIG. 2 of the present disclosure. Upon detection of change in the network topology, the topology change message is forwarded to all the interfaces associated with the logical topology which are affected by said change. The LTN of the interfaces associated with the logical topology affected by the change is then changed at 330. In one embodiment, changing the LTN comprises incrementing the LTN. In the present scenario, the interfaces affected by the topology change are interfaces I1 and I3 of nodes N1, N2, N3 and N4. Hence, the logical topology number of interface I1 and I3 of nodes N1, N2, N3 and N4 is incremented to 2.

Now, a frame is sent to the destination address M4 from the source node N3 at 340. The frame being sent first arrives at the client interface I2 of the node N3 and the forwarding database of the node N3 is looked up for routing the data on the network to the destination address M4. The entry of destination address M4 in the forwarding database of the source node N3 illustrates the interface as 1 and logical topology number as 1. The logical topology number (LTN) associated with the destination address M4 in the forwarding table of the node N3 is compared with the LTN associated with the interface I1 of the logical topology at 350.

As the LTN of the interface was incremented, there is a mismatch between the two LTN's. Upon detection of the mismatch, all the entries relating to the destination address M4 are invalidated or deleted from the forwarding database of the node N3 and the frame is broadcast on all the interfaces of the logical topology for entering new entries into the forwarding database at 370.

In another embodiment, if the network is free of all faults, there is no change in network topology at 310, the frame being sent first arrives at the client interface I2 of the node N3 and the forwarding database of the node N3 is looked up for routing the data on the network to the destination address M4 at 340. The entry of destination address M4 in forwarding database of the node N3 illustrates the interface as 1 and logical topology number as 1. The logical topology number (LTN) associated with the destination address in the forwarding table of node is compared with the LTN associated with the interface of the logical topology at 350. As there is no change in network topology, hence compared LTN's are same and the frame travels from interface I1 of node N3 to interface I3 of node N4 360.

Figure 4:
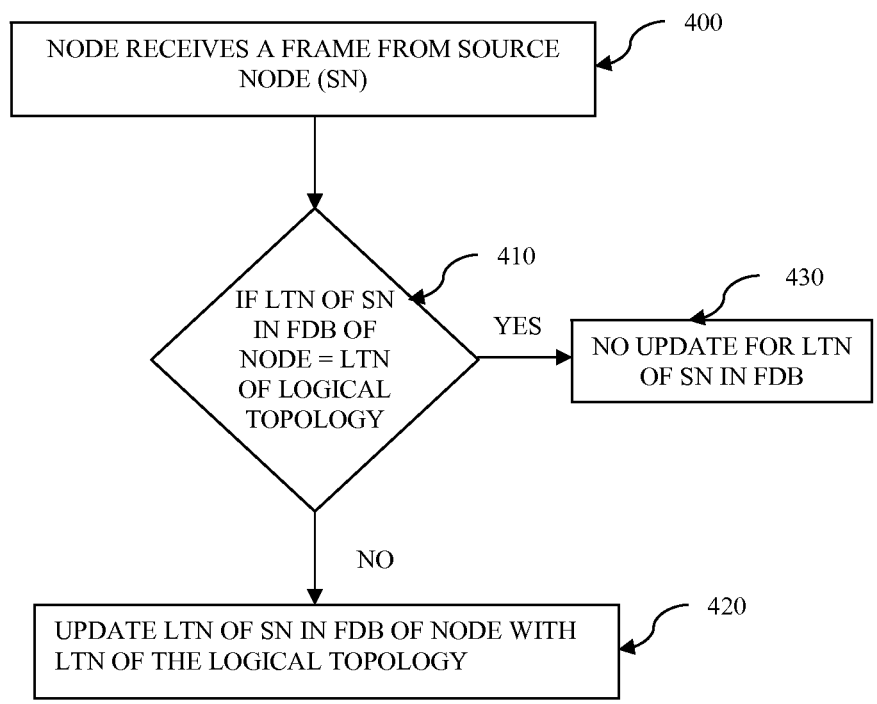
FIG. 4 illustrates a flowchart for method of managing a change in logical topology according to another embodiment of the present disclosure.

FIG. 4 illustrates a flowchart for method of managing a change in logical topology according to another embodiment of the present disclosure.

In an embodiment, a frame is sent from the source node to the destination node through other nodes in the network. The node receives a frame sent from the source node at 400. Upon receiving, the node compares the LTN of the interface in logical topology on which the frame was received with LTN of the source address entry in the forwarding database of the node at 410. In case of a mismatch, the LTN of the source address entry in the forwarding database of the node is updated with LTN of interface in the logical topology at 420. When no mismatch is found in LTN, LTN associated with the source address entry in the forwarding database of the node is left unchanged at 430.

Similarly, when a frame is being sent from a source node to destination node, the node compares the LTN of the interface in logical topology on which the frame is to be sent with LTN of the destination address entry in the forwarding database of the node. In case of a mismatch, the destination address entry in the forwarding database of the node is flushed. Also, the frame is broadcast or black holed as appropriate in the network.

In the present disclosure, the entries in the forwarding database are not flushed until the entries are used and found as invalid. The validity of an entry in the forwarding database is verified at the time of using that entry. Further, in the present disclosure, the entries of the forwarding database are flushed intelligently without arbitrarily removing the forwarding database resulting in flooding. Further, the present disclosure helps in having the topology convergence time independent of flush activities. Also, the concept of LTN used in the present disclosure is a link local/logical topology local concept and using this concept does not change the existing protocol specifications required by the communication protocol. The nodes implemented with LTN feature can be replaced in a network with existing nodes.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for managing a logical topology change in a physical network, said network comprising a plurality of nodes having one or more interfaces associated with the logical topology and a Layer 2 Ethernet bridge forwarding database, said method comprising:
    transmitting a frame from a client interface of a source node to a client interface of a destination node;
    maintaining a logical topology number (LTN) in every node of the logical topology;
    identifying a change in the logical topology in response to the step of transmitting;
    generating a topology change message to notify the plurality of nodes in the logical topology about the changes in the logical topology;
    changing the LTN associated with the logical topology of each interface of the logical topology affected by the change upon receipt of the topology change message;
    comparing the LTN associated with the logical topology with the LTN associated with the destination address in forwarding database of the node;
    invalidating all the entries relating to the destination node from the forwarding database, if there is a mismatch in the comparison; and performing one of:
        broadcasting the frame on all the interfaces of the logical topology for making new entries into the forwarding database; or
        dropping the frame,
    for managing the logical topology change in the physical network.

2. The method as claimed in claim 1, upon receipt of the frame, updating the LTN associated with the source address in the forwarding table if LTN associated with the logical topology is not equal to LTN associated with the source address in the forwarding table.

3. The method as claimed in claim 1, wherein the network is selected from a group comprising bridged virtual local area network, Ethernet network, Layer 2 Ethernet forwarding database based LAN, and other packet switched network.

4. The method as claimed in claim 1, wherein the forwarding database comprises a plurality of entries including address of the destination node, interface and the logical topology number.

5. The method as claimed in claim 1, wherein the topology change messages are selected from messages defined in IEEE standards, ITU standards and other standards relating to change in the logical topology.

6. The method as claimed in claim 1, wherein broadcasting of the frame is done for a Layer 2 of the OSI Reference Model.

7. The method as claimed in claim 1, wherein dropping of the frames is done for Layer 3 of the OSI Reference Model.

8. A system for managing a logical topology change in a physical network, the system comprising:
    a network comprising a plurality of nodes defining a logical topology;
    each of the nodes having one or more interfaces associated with the logical topology and a forwarding database of Layer 2 Ethernet bridge,
    wherein each of the plurality of nodes maintains a logical topology number (LTN) associated with the logical topology; and
    a processor configured to:
        transmit a frame from a client interface of a source node to a client interface of a destination node;
        maintain said logical topology number (LTN) for each node of the logical topology;
        identify a change in the logical topology;
        generate a topology change message to notify the plurality of nodes about the changes in the logical topology;
        change the LTN associated with the logical topology upon receipt of a topology change message;
        compare the LTN associated with the interface of the logical topology with the LTN associated with the destination node in the forwarding database;
        invalidating all entries in the forwarding database of the destination node, if there is a mismatch in the comparison; and
        performing one of:
            broadcasting the frame on all the interfaces of the logical topology for making new entries into the forward database; or
            dropping the frame;
    to manage the logical topology change in the physical network.

* * * * *